(12) United States Patent
Yamaguchi

(10) Patent No.: US 9,509,191 B2
(45) Date of Patent: Nov. 29, 2016

(54) ELECTRIC MOTOR WITH BALL BEARING ASSEMBLY FOR ROTARY SHAFT

(75) Inventor: Akira Yamaguchi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 165 days.

(21) Appl. No.: 14/239,949

(22) PCT Filed: Aug. 21, 2012

(86) PCT No.: PCT/JP2012/005216
§ 371 (c)(1),
(2), (4) Date: Feb. 20, 2014

(87) PCT Pub. No.: WO2013/046526
PCT Pub. Date: Apr. 4, 2013

(65) Prior Publication Data
US 2014/0184004 A1  Jul. 3, 2014

(30) Foreign Application Priority Data
Sep. 29, 2011 (JP) ................. 2011-213963

(51) Int. Cl.
*H02K 5/173* (2006.01)
*F16C 25/06* (2006.01)
*F16C 33/78* (2006.01)
*F16C 35/04* (2006.01)
*F16C 25/08* (2006.01)

(52) U.S. Cl.
CPC ............ *H02K 5/173* (2013.01); *F16C 25/083* (2013.01); *F16C 33/78* (2013.01); *F16C 35/04* (2013.01); *H02K 5/1732* (2013.01); *F16C 2380/26* (2013.01); *H02K 2205/03* (2013.01)

(58) Field of Classification Search
CPC ............................ H02K 5/173; F16C 25/083

USPC .................... 310/90; 384/513, 517
See application file for complete search history.

(56) References Cited

U.S. PATENT DOCUMENTS

| 2,188,251 A | * | 1/1940 | Nelson ................. B23Q 1/265 384/517 |
| 5,624,193 A | | 4/1997 | Vogelsberger et al. |
| 5,726,511 A | * | 3/1998 | Kusase ................... H02K 5/10 310/52 |
| 5,961,223 A | | 10/1999 | Saigusa |

(Continued)

FOREIGN PATENT DOCUMENTS

| CN | 1115365 | 1/1996 |
| CN | 1136649 | 11/1996 |

(Continued)

OTHER PUBLICATIONS

Machine Translation, Hoerauf, DE 19843226 A1, Mar. 30, 2000.*
English Translation of Chinese Search Report dated Aug. 24, 2015 for the related Chinese Patent Application No. 201280047923.1.
English Translation of Chinese Search Report dated Apr. 15, 2016 for the related Chinese Patent Application No. 201280047923.1.

*Primary Examiner* — Thomas Truong
(74) *Attorney, Agent, or Firm* — Hamre, Schumann, Mueller & Larson, P.C.

(57) ABSTRACT

An electric motor includes a rotor having a rotary shaft, a pair of ball bearings for supporting the rotary shaft, and two brackets having bearing housings for holding the ball bearings. The motor further includes a washer between one of the ball bearings and an end wall of one of the bearing housings. The washer includes a plurality of claws. The washer is configured including a ring-shaped yoke and the claws the center parts of which are fastened to the yoke. These claws are configured to be bent in a U-shape, and the center part of the U-shape is fastened to the yoke.

11 Claims, 8 Drawing Sheets

(56) References Cited

U.S. PATENT DOCUMENTS

| | | | |
|---|---|---|---|
| 6,179,473 B1* | 1/2001 | Ponson | B62D 1/16 384/517 |
| 2004/0134708 A1 | 7/2004 | Tanaka et al. | |
| 2006/0071566 A1* | 4/2006 | Ha | H02K 5/08 310/89 |
| 2008/0042503 A1* | 2/2008 | Hartkorn | H02K 5/1732 310/90 |
| 2012/0045158 A1* | 2/2012 | Mashino | F16C 25/083 384/513 |

FOREIGN PATENT DOCUMENTS

| | | | |
|---|---|---|---|
| CN | 1310794 C | 4/2007 | |
| DE | 19843226 A1 * | 3/2000 | ............ F16C 25/083 |
| JP | 9-291943 | 11/1997 | |
| JP | 2004-210017 | 7/2004 | |
| JP | 2006-109592 | 4/2006 | |
| JP | 2006-217751 | 8/2006 | |
| JP | 2008-232254 | 10/2008 | |
| JP | 2010-121695 | 6/2010 | |

* cited by examiner

ELECTRIC MOTOR WITH BALL BEARING ASSEMBLY FOR ROTARY SHAFT

TECHNICAL FIELD

The present invention relates to electric motors with ball bearings for use mainly in electric blowers of household electric vacuum cleaners, and in industrial blowers.

BACKGROUND ART

In recent years, a motor is generally used at a high-speed rotation for high power and high efficiency of the motor. However, when the motor is rotated at a high speed, an idling phenomenon (generally called as a creeping phenomenon) tends to occur where its ball bearings slidably rotate in the circumferential direction within bearing housings, in between the ball bearings that support a rotator and the bearing housings of brackets that hold the ball bearings. For this reason, to prevent such the creeping phenomenon, technologies have been conventionally known in which the bearing housings and bearing outer rings for the ball bearings are fitted and fixed by using an adhesive, or alternatively are prevented mechanically from idling by using an anti-idling stopper (Patent Literature 1, for example).

However, such the conventional configuration in which the bearing housings and the bearing outer rings for the ball bearings are fittingly fixed or fixed by using the adhesive has had the following drawbacks caused by heat generation during operation of the motor. That is, this results in the occurrence of a dimensional difference between a dimension between two ball bearing outer rings (generally called as a bearing outer-ring-to-outer-ring dimension) and a dimension between two ball bearing inner rings (generally called as a bearing inner-ring-to-inner-ring dimension), due to differences in thermal expansion coefficients. Then, when the bearing outer rings and the bearing housings are fixed using an adhesive or the like, the dimensional difference greatly influences the ball bearings to cause a backlash inside the ball bearings, leading to problems of, such as, the occurrence of abnormal vibrations and sounds and a breakage of the bearings. In particular, when synthetic-resin brackets are used, the dimensional difference is distinguished between a bearing housing-to-housing dimension and a ball bearing-to-bearing dimension.

Moreover, in Patent Literature 1, the configuration for preventing the idling is configured with a ring part fixed by press-fitting onto the outer ring of the ball bearing, a stopper included in a metal stopper member configured with a flange part, and a fitting part disposed in a resin frame member. Unfortunately, there has been a problem that the configuration disclosed in Patent Literature 1 requires the additional part, i.e. the stopper member, resulting in higher costs. In addition, according to the configuration disclosed in Patent Literature 1, the area becomes narrower at which a bearing mounting part of the resin frame can hold the outer ring of the bearing. For this reason, it becomes difficult to secure the accuracy of holding the bearing outer ring at the bearing mounting part. This has also been a problem.

CITATION LIST

Patent Literature

PTL 1: Unexamined Japanese Patent Publication No. 2006-217751

SUMMARY OF THE INVENTION

An electric motor according to the present invention includes a rotor having a rotary shaft, a pair of ball bearings for supporting the rotary shaft, and two brackets having bearing housings for holding the ball bearings. A washer is disposed between one of the ball bearings and an end wall of one of the bearing housings. The washer includes a plurality of claws.

With this configuration, when the ball bearings are about to idle, the claws of the washers work such that they fit with the ball bearings and the bearing housings, in a wedge-like manner. Accordingly, it is possible to prevent the idling such as a creeping phenomenon. Moreover, even if the dimensional difference as described above occurs between a bearing outer-ring-to-outer-ring dimension and a bearing inner-ring-to-inner-ring dimension, the claws of the washers become deformed to act to absorb the dimensional difference, which allows prevention of the occurrence of a backlash inside the ball bearings. Consequently, in accordance with the electric motor according to the present invention, it is possible to prevent the idling phenomenon of the ball bearings with a bearing pre-load being held, which allows the electric motor that offers low vibrations, low sounds, and improved reliability.

DESCRIPTION OF EMBODIMENTS

Hereinafter, embodiments according to the present invention will be described with reference to the accompanying drawings. Note, however, that the embodiments should not be construed as limitations on the scope of the present invention.

First Exemplary Embodiment

Figure 1:
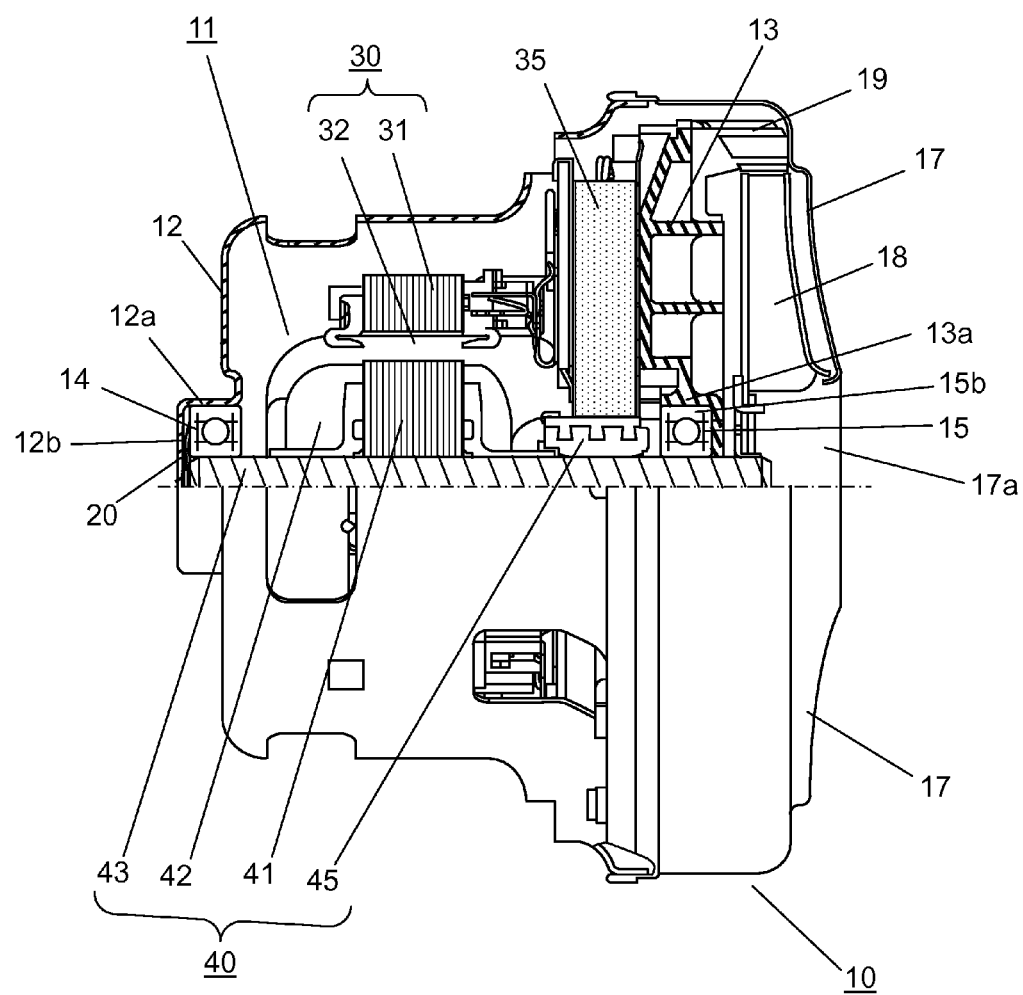
FIG. 1 is a side-elevational view in partial cross-section of an electric motor according to a first embodiment of the present invention.

FIG. 1 is a side-elevational view in partial cross-section of electric motor 10 according to a first embodiment of the present invention. In the embodiment, descriptions of electric motor 10 will be made, using an example of an electric motor for use in an electric blower of such as an electric vacuum cleaner, with the blower including a commutator motor and a blower fan.

Electric motor 10 includes two brackets. That is, first bracket 12 made of a steel sheet, having an approximately cup shape one end of which is opened, and second bracket 13 made of a synthetic resin, disposed in the opening side of first bracket 12. Then, in the inside of the two brackets, commutator motor 11 is disposed. Moreover, electric motor 10 is equipped with fan 18 at an end of rotary shaft 43 protrudeing from second bracket 13, and equipped with air guide 19 partitioning between fan 18 and commutator motor 11.

As shown in FIG. 1, commutator motor 11 is configured including stator 30 that forms a magnetic field, rotor 40 serving as an armature, ball bearing 14 and ball bearing 15 that rotatably support rotor 40, and brushes 35.

Stator 30 is formed by winding magnetic field winding 32 on magnetic field core 31 made of iron or the like. Magnetic field core 31 is formed by stacking a plurality of sheets of magnetic steel having a predetermined shape, for example. Moreover, magnetic field core 31 includes, in the inside thereof, magnetic pole parts serving as magnetic poles, and a spatial part in which rotor 40 is disposed. Such stator 30 is fixed in the inside of first bracket 12.

On the other hand, rotor 40 is configured including armature core 41, armature winding 42, rotary shaft 43, and commutator 45. On armature core 41, armature winding 42 is wound. To commutator 45, lead wires of armature winding 42 drawn out from armature core 41 are connected. Armature core 41 and commutator 45 each have a cylindrical shape, and are bonded with rotary shaft 43 such that the shaft penetrates through the centers of armature core 41 and commutator 45. One end in the output shaft side of rotary shaft 43 is rotatably supported by ball bearing 15, while the other end as an anti-output shaft side of rotary shaft 43 is rotatably supported by ball bearing 14. Thus-configured rotor 40 is disposed in the inner peripheral side of stator 30, with armature core 41 facing the magnetic pole parts that are formed in magnetic field core 31.

Then, to second bracket 13, brush holders are fixed to hold brushes 35. Brushes 35 are configured with carbon brush materials composed of artificial graphite or the like, the composition of which includes a solid lubricant. Thus-configured brushes 35 are held inside the brush holders, and are pressed against commutator 45 by brush springs or the like. Commutator motor 11 includes a pair of brushes 35 configured in this way. The pair of brushes 35 is respectively in contact with commutator 45. In this way, commutator motor 11 is configured.

Moreover, in electric motor 10, fan case 17 is attached to cover the opening side of first bracket 12. Rotary shaft 43 of rotor 40 is configured such that the output shaft side thereof extends from the opening of first bracket 12 through the center part of second bracket 13 to the inside of fan case 17. To the end of rotary shaft 43, fan 18 for blowing air is attached. In addition, air guide 19 is attached between fan 18 and the opening of first bracket 12. In this way, in the inside of fan case 17, fan 18 and air guide 19 are disposed.

Furthermore, in first bracket 12 and second bracket 13, bearing housings are formed in which ball bearing 14 and ball bearing 15 are attached and held. That is, as shown in FIG. 1, in first bracket 12, bearing housing 12a is formed at the center part of the circular end of anti-output shaft side. Bearing housing 12a is formed to have a cylindrical recess in the inside of first bracket 12. Into the cylindrical recess, ball bearing 14 is inserted. On the other hand, in second bracket 13, bearing housing 13a is formed at the circular center part of the bracket. Bearing housing 13a is formed to have a cylindrical recess in the commutator motor 11 side of second bracket 13. Into the cylindrical recess, ball bearing 15 is inserted. Moreover, ball bearing 14 and ball bearing 15 are each a cylindrical bearing that includes a plurality of iron balls between a bearing outer ring and a bearing inner ring. Then, rotary shaft 43 is fastened to the inner peripheral side of the bearing inner ring of each of ball bearings 14 and 15.

As described above, electric motor 10 includes first bracket 12 made of the steel-sheet, second bracket 13 made of the synthetic-resin, and the pair of ball bearing 14 and ball bearing 15 held by bearing housing 12a and bearing housing 13a of first bracket 12 and second bracket 13, respectively. The ball bearings rotatably support rotor 40.

Then, in the embodiment, washer 20 is inserted between end wall 12b of bearing housing 12a of first bracket 12 and the side face of ball bearing 14 housed in bearing housing 12a.

In electric motor 10 thus configured, when power is supplied from the outside to commutator motor 11, an armature current flows through armature winding 42 via brushes 35 and commutator 45, and a magnetic field current flows through magnetic field winding 32 of stator 30. Then, a force is generated between a magnetic flux at magnetic field core 31 caused by the magnetic field current and the armature current flowing through armature winding 42, which thereby causes rotor 40 to rotate with rotary shaft 43 being supported by ball bearing 14 and ball bearing 15. Following the rotation of rotor 40, fan 18 rotates. With this rotation, air is suctioned from suction opening 17a to flow into fan 18, and then discharged through the inside of first bracket 12 to the outside of electric motor 10.

Next, descriptions will be made regarding detailed configurations for suppressing the creeping, according to the embodiment.

Figure 2A:
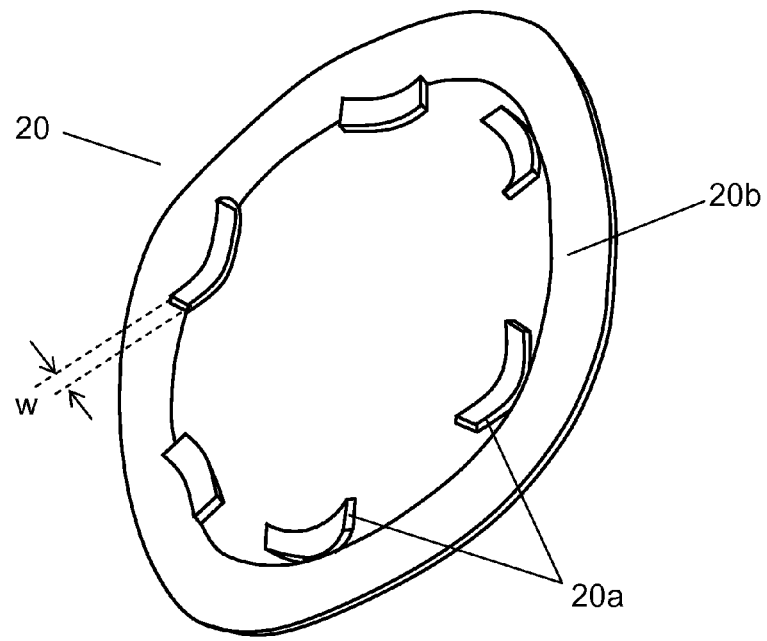
FIG. 2A is an outline view of a washer according to the first embodiment of the invention.
Figure 2B:
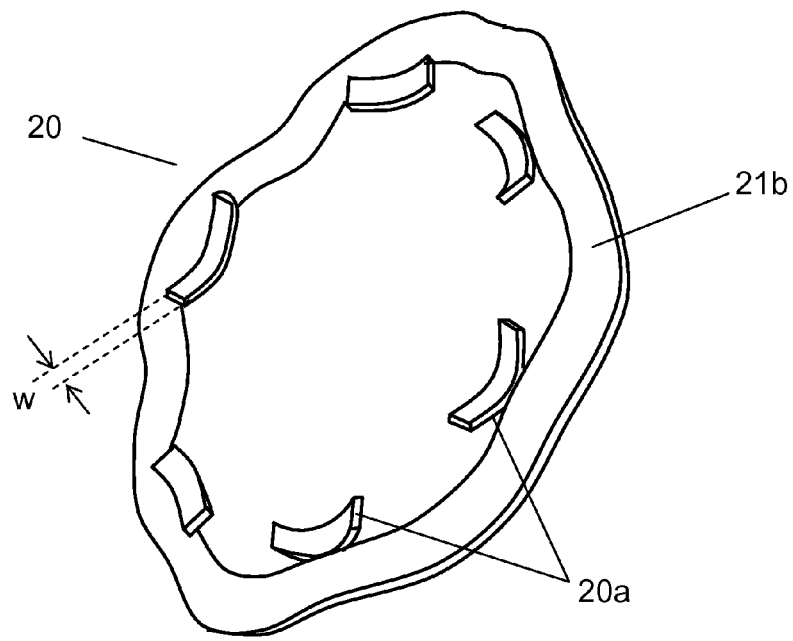
FIG. 2B is an outline view of another configuration example of the washer according to the first embodiment of the invention.

FIG. 2A is an outline view of washer 20 according to the first embodiment of the invention. FIG. 2B is an outline view of another configuration example of washer 20 according to the first embodiment of the invention.

As shown in FIG. 2A, washer 20 includes ring-shaped yoke 20b and a plurality of claws 20a that apply a bearing pre-load to ball bearing 14. In more detail, washer 20 is configured such that, in the inner peripheral side of yoke 20b serving as a flat washer, the plurality of claws 20a bent in a U-shape with predetermined width "w" are disposed to be spaced at regular intervals in the circumferential direction. FIG. 2A shows an example in which six claws 20a are disposed. Moreover, each of claws 20a is formed to be fastened to yoke 20b such that two ends of claw 20a protrude in the direction of one side of the yoke 20b, with a bended center part of claw 20a being fastened to yoke 20b. Moreover, each of claws 20a is arranged such that the both ends thereof are arranged along in the circumferential direction. That is, claw 20a is disposed such that a straight line connecting the both ends of claw 20a intersects a straight line extending radially from the center of yoke 20b.

Moreover, washer 20 shown in FIG. 2B is configured such that a plurality of claws 20a each having a U-shape the same as that of FIG. 2A are disposed in yoke 21b having a ring and corrugated-plate shape. Washer 20 shown in FIG. 2B applies the bearing pre-load to ball bearing 14, by utilizing corrugated-plate-shaped yoke 21b as well as U-shaped claws 20a. That is, in the embodiment, washer 20 applies the bearing pre-load to ball bearing 14, by utilizing spring effects of both the U-shape of claws 20a and the corrugated-plate shape of yoke 21b. Washer 20 shown in FIG. 2B is configured such that, in the inner peripheral side of yoke 21b serving as a corrugated washer, the plurality of claws 20a bent in a U-shape with predetermined width "w" are disposed to be spaced at regular intervals in the circumferential direction, in the same manner as that of FIG. 2A.

Moreover, each of claws 20a is formed to be fastened to yoke 21b such that both ends of claw 20a protrude in the direction of one side of the yoke 21b, with a bended center part of claw 20a being fastened to the crests of the corrugation of yoke 21b. Moreover, each of claws 20a is arranged such that the both ends thereof are arranged along in the circumferential direction.

In the embodiment, use of such claws 20a disposed in washer 20 is intended to prevent the creeping.

Next, descriptions will be made in detail regarding a configuration in which washer 20 is disposed.

Figure 3:
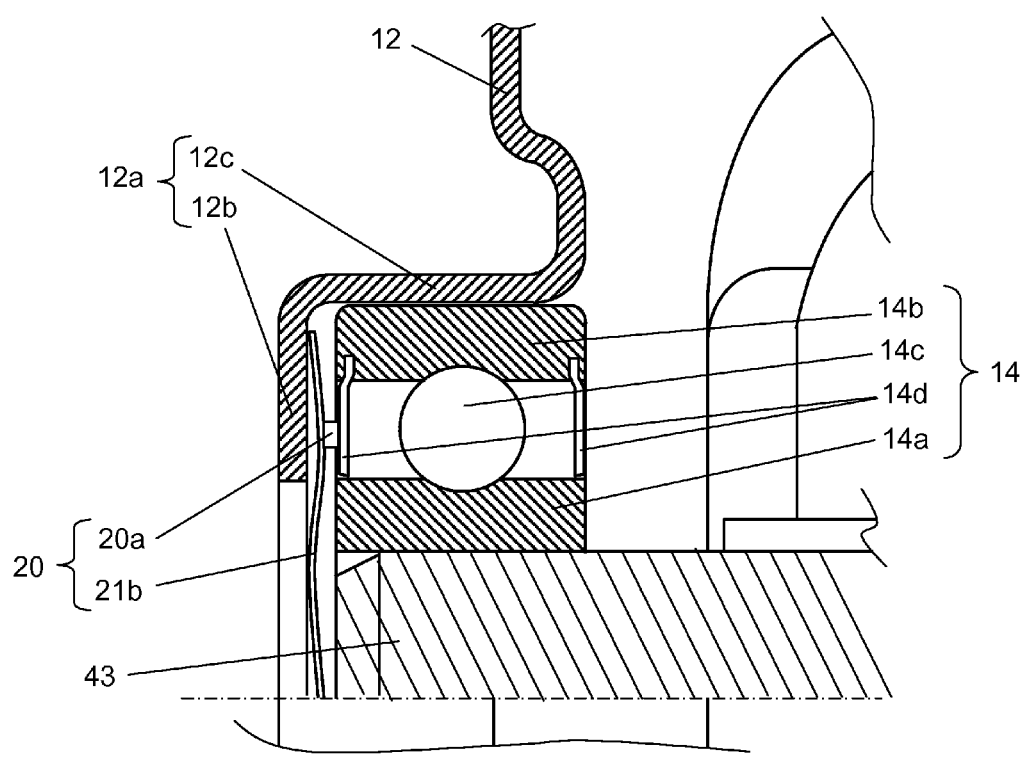
FIG. 3 is an enlarged partial cross-sectional view of a portion around a bearing housing according to the first embodiment of the invention.

FIG. 3 is an enlarged partial cross-sectional view of a portion around bearing housing 12a according to the first embodiment of the present invention.

As shown in FIG. 3, ball bearing 14 includes a plurality of iron balls 14c between bearing inner ring 14a and bearing outer ring 14b. In addition, ball bearing 14 includes bearing seal plates 14d on the circular faces of the ball bearing, with the outer surfaces of the bearing seal plates being covered with rubber. Moreover, to bearing inner ring 14a, end of the anti-output shaft side of rotary shaft 43 is fastened.

Moreover, as described above, first bracket 12 is configured such that bearing housing 12a serving as the cylindrical recess is formed to hold bearing 14. Bearing housing 12a is of the shape configured including: cylinder part 12c having a cylindrical shape, and end wall 12b serving as a circular face of the bottom of the cylinder part.

Into thus-configured bearing housing 12a, ball bearing 14 is inserted such that the outer peripheral surface of bearing outer ring 14b faces the inner peripheral surface of cylinder part 12c of bearing housing 12a. Then, washer 20 is inserted between one of bearing seal plates 14d of ball bearing 14 and end wall 12b of bearing housing 12a. In FIG. 3, washer 20 is disposed such that claws 20a of washer 20 face bearing seal plate 14d. With this configuration, claws 20a of washer 20 are in contact with bearing seal plate 14d with a low load, and ball bearing 14 is held between bearing housing 12a and bearing outer ring 14b, with the ball bearing 14 being freely slidable in the direction of the shaft length.

On the other hand, as for ball bearing 15 in the second bracket 13 side, ball bearing 15 is inserted and held in bearing housing 13a of second bracket 13, as shown in FIG. 1. Then, bearing housing 13a and bearing outer ring 15b of ball bearing 15 are fixed by bonding using an adhesive, or alternatively are fixed by press-fitting.

In thus-configured electric motor 10, when rotor 40 rotates at a high speed, a force (an idle rotating force) is generated by which ball bearing 14 is caused to slidably rotate in the circumferential direction via washer 20, in between ball bearing 14 and bearing housing 12a. However, when such the idle rotating force is generated, both ends of each of claws 20a of washer 20 become fitted into bearing seal plate 14d of ball bearing 14, in a wedge-like manner, which results in an increase in a static frictional force. In the embodiment, the arrangement of washer 20 in this way allows the higher coefficient of static friction between claws 20a and bearing outer ring 14b of ball bearing 14, facing each other, which results in the prevention of the creeping phenomenon in which ball bearing 14 rotates at idle. Moreover, in the embodiment, the surface of bearing seal plate 14d in contact with claws 20a is of a rubber type. Use of such the rubber type allows the further higher static friction coefficient with respect to washer 20 as well as the prevention of a deformation of bearing seal plates 14d caused by the bearing pre-load, and resulting in the improved effect of preventing the creeping phenomenon.

Note that, although the above description has been made using the example in which washer 20 is disposed such that claws 20a are arranged in the bearing seal plate 14d side, washer 20 may be disposed such that claws 20a are arranged in the end wall 12b side of bearing housing 12a. Even with this configuration, it provides the higher static friction coefficient between claws 20a and end wall 12b facing each other, in the same manner, which allows the effect of preventing the creeping phenomenon.

Moreover, the side in which claws 20a are disposed is preferably determined as follows. Here, let $\mu1$ be the static friction coefficient between ball bearing 14, i.e. bearing seal plate 14d, and the ends of claws 20a of washer 20; let $\mu2$ be the static friction coefficient between end wall 12b of bearing housing 12a and the ends of claws 20a of washer 20. Then, washer 20 may be inserted such that claws 20a face the side providing lower one of static friction coefficient $\mu1$ and static friction coefficient $\mu2$. The configuration shown in FIG. 3 according to the embodiment illustrates the case of $\mu1<\mu2$ in which washer 20 is disposed such that claws 20a are sandwiched between yoke 21b and bearing seal plate 14d.

The occurrence of the creeping phenomenon is involved in the two cases. That is, one is the case where washer 20 rotates together with ball bearing 14, and the other is the case where washer 20 does not rotate but only ball bearing 14 rotates. In the embodiment, in order to address the thus-occurring creeping phenomenon, resistance against the idle rotating force is reinforced by arranging claws 20a in the bearing seal plate 14d side that provides the lower one of the static friction coefficients. In this way, claws 20a are formed in one side of washer 20, with the one side providing lower one of static friction coefficient $\mu1$ and static friction coefficient $\mu2$, which allows larger frictional resistance as a whole and results in the more effective prevention of the idling.

Figure 4A:
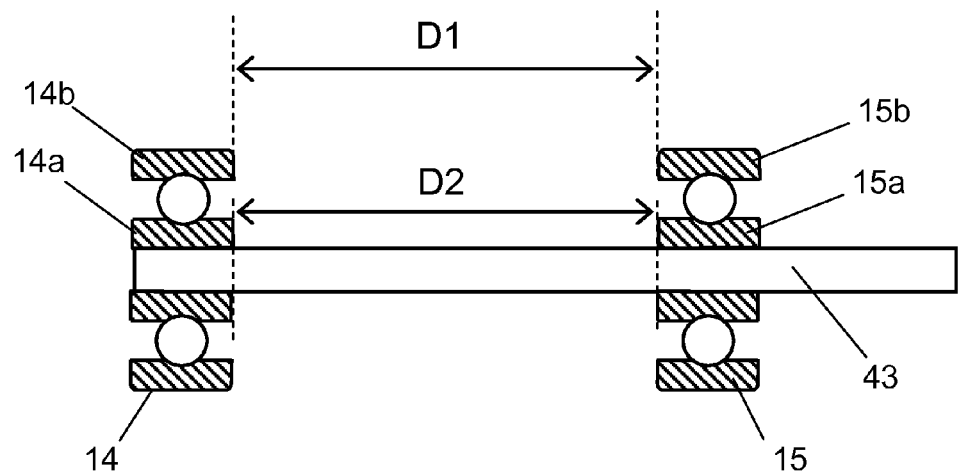
FIG. 4A is a view illustrating bearing outer-ring-to-outer-ring dimension D1 and bearing inner-ring-to-inner-ring dimension D2.

By the way, as described above, when temperature of each part of electric motor 10 rises due to heat generation during the operation of electric motor 10, a dimensional difference (generally, D1>D2) occurs between bearing outer-ring-to-outer-ring dimension D1 between ball bearing 14 and ball bearing 15, and bearing inner-ring-to-inner-ring dimension D2 between ball bearing 14 and ball bearing 15. This is attributed to the heat generation and differences in thermal expansion coefficients among the configuration members. FIG. 4A is a view illustrating bearing outer-ring-to-outer-ring dimension D1 and bearing inner-ring-to-inner-ring dimension D2. As shown in FIG. 4A, bearing outer-ring-to-outer-ring dimension D1 is the dimension between bearing outer ring 14b of ball bearing 14 and bearing outer ring 15b of ball bearing 15. Moreover, bearing inner-ring-to-inner-ring dimension D2 is the dimension between bearing inner ring 14a of ball bearing 14 and bearing inner ring 15a of ball bearing 15. In particular, when the synthetic-resin brackets are used, the dimensional difference becomes remarkable during a hot time.

In the embodiment, in more detail, in order to suppress the occurrence of a backlash inside the ball bearings due to such the dimensional difference, washer 20 is used as follows.

As described above, in the embodiment, bearing outer ring 14b of ball bearing 14 and bearing housing 12a of first bracket 12 are configured to be freely slidable between each other in the direction of the shaft length. For this reason, even when the dimensional difference occurs between bearing outer-ring-to-outer-ring dimension D1 and bearing inner-ring-to-inner-ring dimension D2, bearing outer ring 14b can slidingly move relative to bearing housing 12a in the direction of the shaft length, which thereby can absorb an influence of the dimensional difference on the inside of the ball bearings.

Figure 4B:
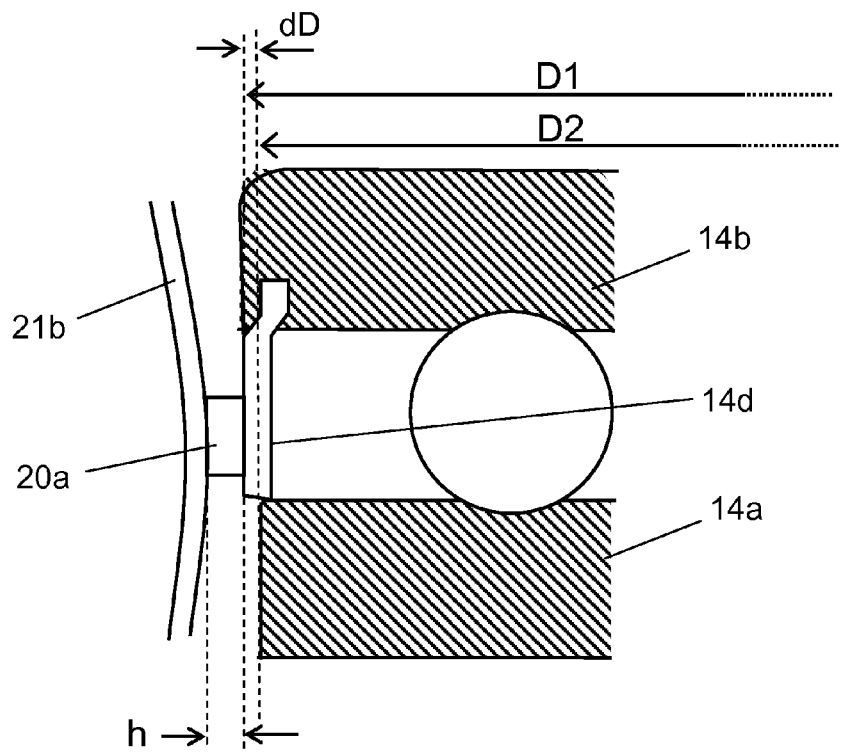
FIG. 4B is a view illustrating a ball bearing according to the first embodiment of the invention, in a state where the ball bearing having a dimensional difference slidingly moves in the direction of a shaft length.

FIG. 4B is a view illustrating the state in which ball bearing 14 having dimensional difference dD slidingly moves in the direction of the shaft length. FIG. 4B shows an example of the case where bearing outer-ring-to-outer-ring dimension D1 becomes larger than bearing inner-ring-to-inner-ring dimension D2. Like this example, suppose that bearing outer-ring-to-outer-ring dimension D1 becomes larger than bearing inner-ring-to-inner-ring dimension D2. In this case, claws 20a having the U-shape are deformed to change their height "h," thereby absorbing the influence of thus-lengthened bearing outer-ring-to-outer-ring dimension D1. Responding to dimensional difference dD, claws 20a act in this way, which can maintain the stable bearing pre-load. This makes it possible to smoothly absorb the changes, due to temperatures, of bearing outer-ring-to-outer-ring dimension D1 and bearing inner-ring-to-inner-ring dimension D2.

In the embodiment, concerning the idle rotating force applied as a force in the circumferential direction, the creep phenomenon is prevented by utilizing claws 20a disposed in the circumferential direction of washer 20, through the fitting of claws 20a in a wedge-like manner. In addition, concerning the force applied in the thrust direction due to the dimensional difference as described above, the occurrence of the backlash inside ball bearing 14 and ball bearing 15 is prevented through the deformation of claws 20a. In this way, in the embodiment, the backlash inside ball bearings 14 and 15 is prevented as well as the creeping phenomenon, which allows electric motor 10 offering stably-low vibrations and sounds.

Moreover, with such the configuration, it is possible to eliminate the work conventionally needed for applying the adhesive and the like, resulting in higher workability and increased cost savings.

Second Exemplary Embodiment

Figure 5:
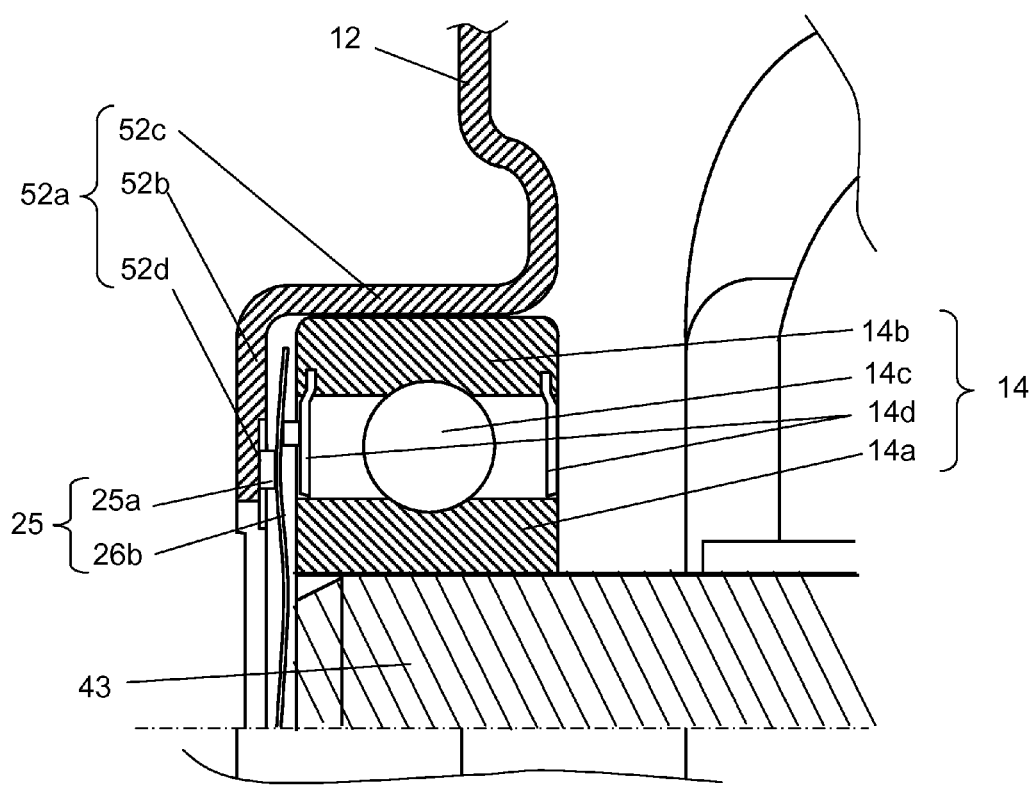
FIG. 5 is an enlarged partial cross-sectional view of a portion around a bearing housing according to a second embodiment of the present invention.

FIG. 5 is an enlarged partial cross-sectional view of a portion around bearing housing 52a of first bracket 12 according to a second embodiment of the present invention. In comparison with the first embodiment, electric motor 10 according to the embodiment is different in the configuration of bearing housing 52a disposed in the anti-output shaft side of rotary shaft 43, and in the configuration of washer 25 disposed in bearing housing 52a. The configurations of the other parts are the same as those of the first embodiment. Therefore, detailed descriptions thereof will be omitted.

Also in the embodiment, in first bracket 12, bearing housing 52a serving as a cylindrical recess is formed to hold bearing 14. Bearing housing 52a is approximately of a shape which is configured including cylinder part 52c having a cylindrical shape and end wall 52b serving as a circular face of the bottom of the cylinder part.

Into thus-configured bearing housing 52a, ball bearing 14 is inserted such that the outer peripheral surface of bearing outer ring 14b faces the inner peripheral surface of cylinder part 52c of bearing housing 52a. Then, washer 25 is inserted between one of bearing seal plates 14d of ball bearing 14 and end wall 52b of bearing housing 52a.

Next, descriptions of washer 25 and bearing housing 52a in such the configuration will be made in more detail.

Figure 6A:
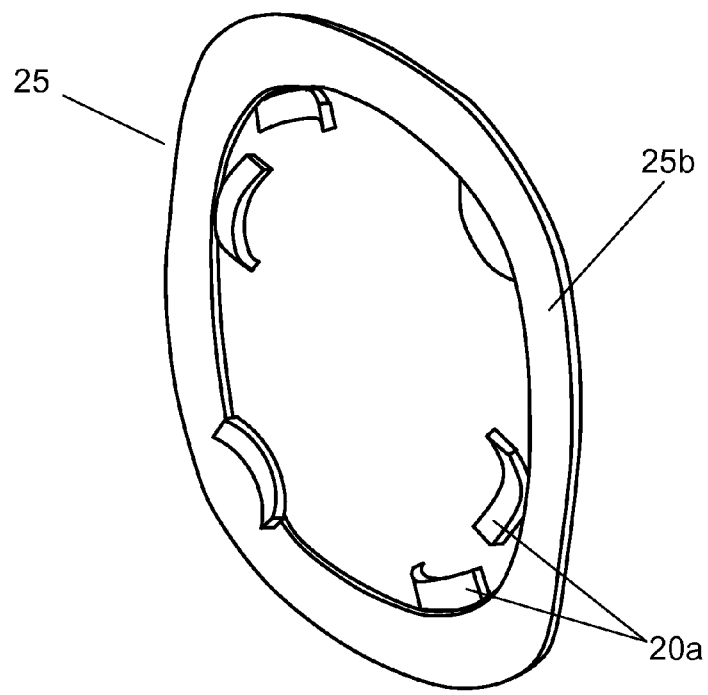
FIG. 6A is an outline view of a washer according to the second embodiment of the invention.
Figure 6B:
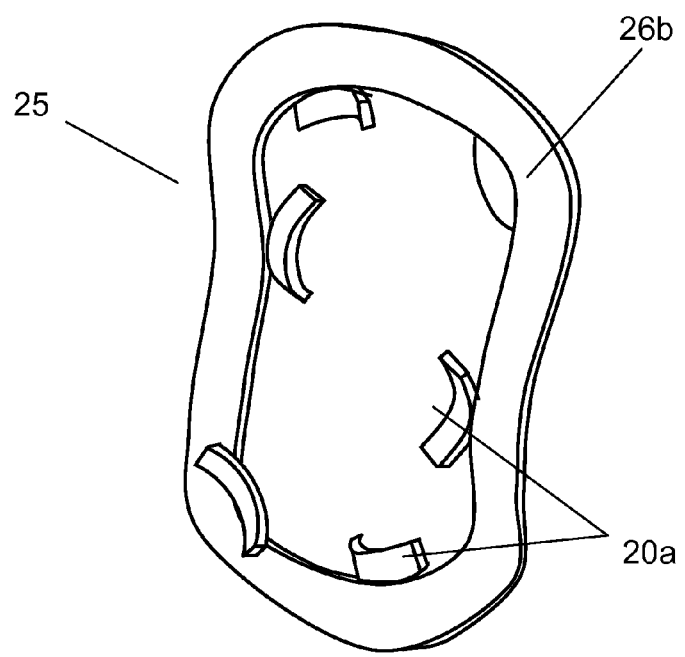
FIG. 6B is an outline view of another configuration example of the washer according to the second embodiment of the invention.

First, FIG. 6A is an outline view of washer 25 according to the second embodiment of the present invention. FIG. 6B is an outline view of another configuration example of washer 25 according to the second embodiment of the invention.

As shown in FIG. 6A, washer 25 includes ring-shaped yoke 25b and a plurality of claws 20a that applies a bearing pre-load to ball bearing 14. In more detail, washer 25 is configured such that, in the inner peripheral side of yoke 25b serving as a flat washer, the plurality of claws 20a each having a U-shape the same as that of the first embodiment are disposed to be spaced at regular intervals in the circumferential direction. Here, in the embodiment, as shown in FIG. 6A, claws 20a are disposed to face both ball bearing 14 and end wall 52b of first bracket 12. That is, each of claws 20a is disposed such that the orientations of the ends of the adjacent claws 20a are opposite to each other. FIG. 6A shows an example of the configuration in which three claws 20a face the direction toward ball bearing 14 while the other three claws 20a face the direction toward end wall 52b. Moreover, washer 25 shown in FIG. 6B is configured such that the plurality of claws 20a each having the same U-shape as that of FIG. 6A is disposed in yoke 26b having a ring and corrugated-plate shape, with the orientations of the ends of the claws 20a being alternately opposite to each other. Furthermore, each of claws 20a of FIGS. 6A and 6B is such that both ends of the each are arranged along the circumferential direction, in the same manner as the first embodiment.

Figure 7A:
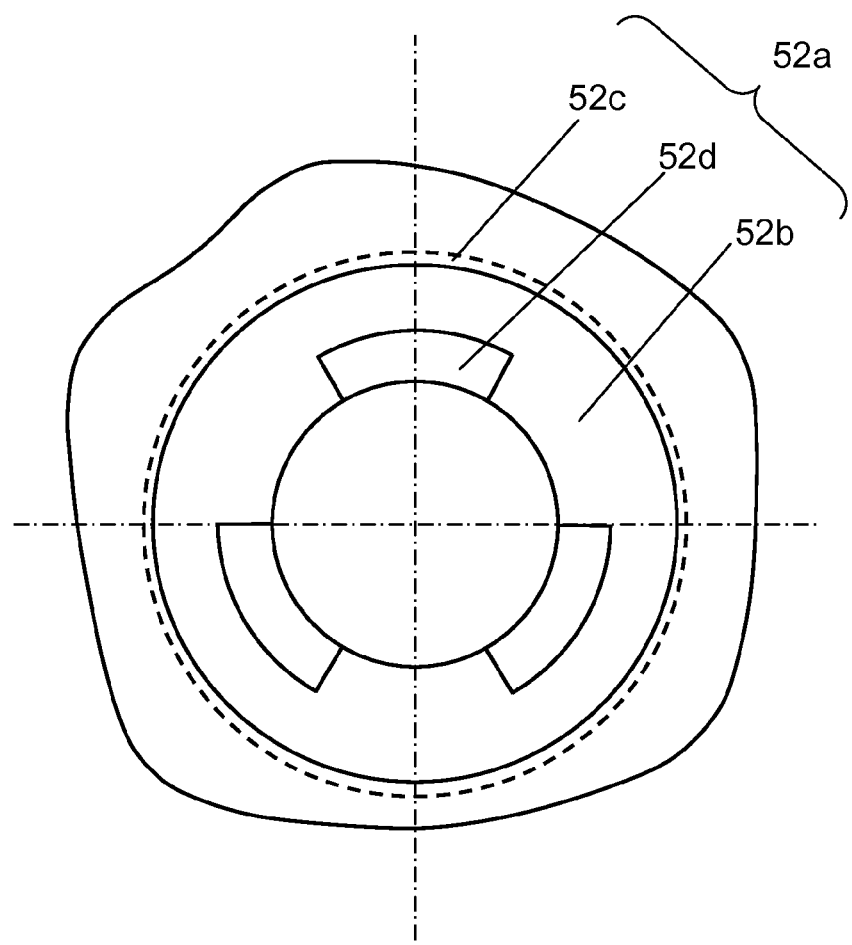
FIG. 7A is an elevational view of the bearing housing according to the second embodiment of the invention.
Figure 7B:
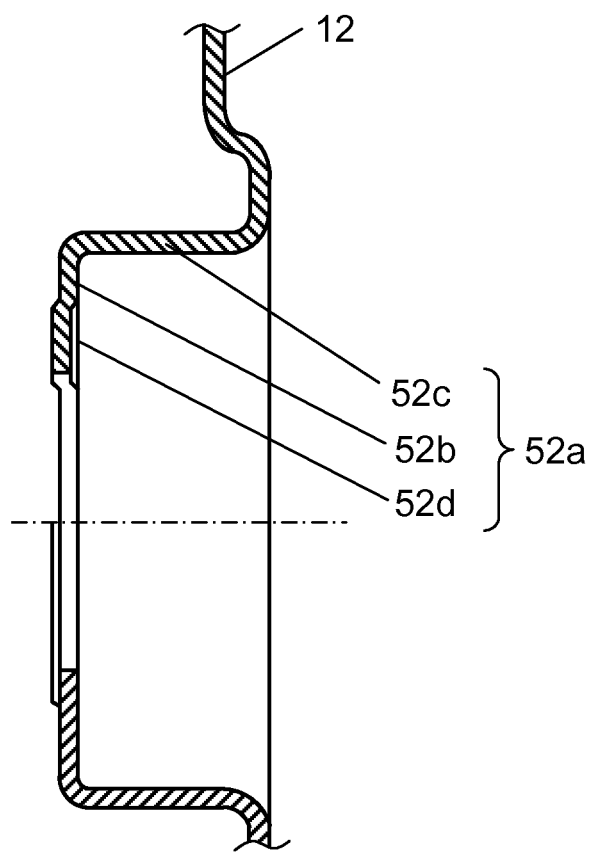
FIG. 7B is a cross-sectional view of the bearing housing according to the second embodiment of the invention.

Next, FIG. 7A is an elevational view of bearing housing 52a of first bracket 12 according to the second embodiment of the present invention. FIG. 7B is a cross-sectional view of the bearing housing 52a of first bracket 12 according to the second embodiment of the present invention.

As shown in FIGS. 7A and 7B, first bracket 12 includes, at the center part thereof, bearing housing 52a to hold ball bearing 14. Then, in end wall 52b of bearing housing 52a, a plurality of end-wall step heights 52d extending radially is disposed in the radial direction. Such end-wall step heights 52d are disposed to be engaged with claws 20a of washer 25. Therefore, FIG. 7A shows an example in which three of end-wall step heights 52d are disposed corresponding in number to the number of claws 20a in the end wall 52b side shown in FIGS. 6A and 6B.

That is, in the embodiment, as shown in FIG. 5, ball bearing 14 includes bearing seal plate 14d, the surface of which is covered with rubber, in the side face of the ball bearing facing washer 25. In addition, claws 20a of washer 25 are in contact with bearing seal plate 14d with a low load. Then, claws 20a that face end wall 52b of first bracket 12 are engaged with end-wall step heights 52d.

As described above, in the embodiment, claws 20a are disposed in both sides of washer 25. Consequently, it is possible to prevent both idling phenomena, i.e. the idling between ball bearing 14 and washer 25 and the idling between washer 25 and bearing housing 52a.

Moreover, with such the configuration, it is possible not only to provide the more reliable prevention of the idling, but also to eliminate the need for controlling the insertion orientation of washer 25 in assembling of electric motor 10, resulting in a further improvement in the workability of the assembling.

Note that, the descriptions have been made in the first and second embodiments using the case where second bracket 13 in the output shaft side is made of the synthetic resin and first bracket 12 in the anti-output shaft side is made of the steel sheet. However, each of the brackets may be made of one of the synthetic resin and the steel sheet.

Moreover, the descriptions have been made in the first and second embodiments using the case where the surface of bearing seal plate 14d of ball bearing 14 is of the rubber type. However, the surface may be of a steel sheet type.

As described above, the electric motor according to the present invention is configured including the washer between one of the ball bearings and the end wall of the bearing housing, with the washer having the plurality of the claws.

With this configuration, by utilizing the claws, it is possible to prevent the idling of the ball bearings, such as the creeping phenomenon, and also to prevent the occurrence of the backlash inside the bearings even when the dimensional difference occurs during a hot time. Consequently, in accordance with the electric motor according to the present invention, it is possible to provide the electric motor offering low vibrations and sounds which is capable of preventing the idling phenomenon of the bearings with stable bearing pre-loads being held.

INDUSTRIAL APPLICABILITY

The electric motor of the present invention is suitable to use for preventing the idling of the ball bearings, and for improving the reliability of the motor that employs synthetic-resin brackets. The electric motor of the present invention is also useful in applications including usage at a high-speed rotation and usage that requires reliability at high temperatures.

REFERENCE MARKS IN THE DRAWINGS 10 electric motor
11 commutator motor
12 first bracket
12a, 13a, 52a bearing housing
12b, 52b end wall
12c, 52c cylinder part
13 second bracket
14, 15 ball bearing
14a, 15a bearing inner ring
14b, 15b bearing outer ring
14c iron ball
14d bearing seal plate
17 fan case
17a suction opening
18 fan
19 air guide
20, 25 washer
20a claw
20b, 21b, 25b, 26b yoke
30 stator
31 magnetic field core
32 magnetic field winding
35 brush
40 rotor
41 armature core
42 armature winding
43 rotary shaft
45 commutator
52d end-wall step height

The invention claimed is:
1. An electric motor comprising:
a rotor including a rotary shaft;
first and second ball bearings supporting the rotary shaft, at least the first ball bearing having a ball, a bearing seal plate and a side wall;
first and second brackets including first and second bearing housings that hold the first and second ball bearings, respectively, the first bearing housing having an end wall; and
a washer being disposed between the side wall of the first ball bearing and the end wall of the first bearing housing,
wherein the bearing seal plate is spaced apart from the ball in a direction along the rotary shaft,
the washer includes a plurality of claws, each of the claws protruding in the direction along the rotary shaft, and
at least one of the claws faces and is wedged against at least one of the bearing seal plate and the end wall of the first bearing housing so as to generate a frictional force in the circumferential direction between the at least one of the claws and the at least one of the bearing seal plate and the end wall of the first bearing housing.
2. The electric motor according to claim 1,
wherein the washer includes a ring-shaped yoke,
each of the plurality of the claws includes a center part, the center part being fastened to the yoke, and
each of the claws is bent in a U-shape, and is wedged against at least one of the bearing seal plate and the end wall of the first bearing housing by both ends of the U-shape protruding in a direction along the rotary shaft.
3. The electric motor according to claim 2, wherein the yoke has a corrugated shape.
4. The electric motor according to claim 2, wherein both distal portions of the both ends of the U-shape are protruding in the direction along the rotary shaft.
5. The electric motor according to claim 1, wherein the second ball bearing and the second bearing housing are fixed to each other.
6. The electric motor according to claim 1, wherein the claws are disposed to face a side providing lower one of μ1 and μ2 where μ1 is a static friction coefficient between the first ball bearing and the claws of the washer, and μ2 is a static friction coefficient between the end wall of the first bearing housing and the claws of the washer.
7. The electric motor according to claim 1, wherein the claws are disposed facing both sides such that the claws face both the first ball bearing and the end wall of the first bearing housing.
8. The electric motor according to claim 1, wherein at least one of the first and second brackets is made of a synthetic resin.
9. The electric motor according to claim 1, wherein the bearing seal plate is of a rubber type, the bearing seal plate being held in contact with the claws.
10. The electric motor according to claim 1, wherein an end-wall step height is disposed in the end wall of the first bearing housing facing the claws, the end-wall step height fitting into the claws.
11. The electric motor according to claim 1, wherein a portion of the at least one of the bearing seal plate and the end wall of the first bearing housing in contact with the at least one of the claws is at a position overlapping the ball as viewed in the direction along the rotary shaft.

\* \* \* \* \*